United States Patent
Miyanabe et al.

[11] Patent Number: 6,084,837
[45] Date of Patent: Jul. 4, 2000

[54] APPARATUS FOR REPRODUCING INFORMATION RECORDED ON A RECORDING MEDIUM, HAVING A CROSSTALK REDUCING CIRCUIT

[75] Inventors: Shogo Miyanabe; Hiroki Kuribayashi, both of Tsurugashima, Japan

[73] Assignee: Pioneer Electronic Corporation, Tokyo, Japan

[21] Appl. No.: 09/017,028

[22] Filed: Feb. 2, 1998

[30] Foreign Application Priority Data

Feb. 4, 1997 [JP] Japan ................................. 9-35607

[51] Int. Cl.⁷ ...................................................... G11B 7/00
[52] U.S. Cl. ................................. 369/59; 369/47
[58] Field of Search .................. 369/54, 58, 59, 369/47, 48, 49, 50; 360/48, 51, 53, 39

[56] References Cited

U.S. PATENT DOCUMENTS 5,835,467  11/1998  Tomita et al. .............................. 369/59

FOREIGN PATENT DOCUMENTS

6-162515  6/1994  Japan .

*Primary Examiner*—Muhammad Edun
*Attorney, Agent, or Firm*—Morgan, Lewis & Bockius LLP

[57] ABSTRACT

An apparatus for reproducing information recorded on a recording medium includes a signal reader for outputting signals read from a main track on the recording medium to be reproduced and for reading tracks adjacent to the main track. A variable filter for filtering the signal read from the adjacent track is also included to convert the signal into a crosstalk signal to the main track and a subtractor is utilized for subtracting the crosstalk signal from the signal read from the main track. The apparatus further includes a crosstalk signal corrector for correcting the level of the crosstalk signal based on the signal read from the main track.

15 Claims, 11 Drawing Sheets

APPARATUS FOR REPRODUCING INFORMATION RECORDED ON A RECORDING MEDIUM, HAVING A CROSSTALK REDUCING CIRCUIT

This application claims the benefit of Japanese Application No. 9-35607, filed on Feb. 4, 1997, which is hereby incorporated by reference.

BACKGROUND OF THE INVENTION

1. Field of the Invention

The present invention relates to apparatus for reproducing information recorded on a recording medium such as an optical disk and, more particularly, to an apparatus for reproducing recording information recorded on a main track of a recording medium while canceling crosstalk from adjacent tracks included in the signal read from the main track.

2. Description of the Prior Art

Recording of information on optical disks at higher densities has been pursued by narrowing the track pitch. However, in using the method wherein a track pitch is narrowed, the track pitch is limited by the diameter of a laser beam focused on the disk. A signal from a main track is undesirably accompanied by signals from tracks adjacent thereto when the track pitch is narrowed without changing the laser beam diameter. Thus, a problem has arisen in that an increase in crosstalk from the adjacent tracks reduces the signal-to-noise ratio, making it impossible to reproduce a recorded signal accurately.

Under such circumstances, control has been employed in an apparatus for reproducing information recorded on a recording medium utilizing, for example, an optical pick-up having three beams for reading. The main track is irradiated with a main beam under tracking control to read a signal associated with the main track, and a crosstalk signal is produced based on an output of received light which is two sub-beams projected on and reflected by respective tracks adjacent to the main track, i.e., inside and outside the main track. The crosstalk signal is subtracted from the signal read from the main track to cancel the crosstalk, thereby reducing the effect of the crosstalk from each of the adjacent tracks, i.e., inside and outside the main track to be reproduced.

Figure 9:
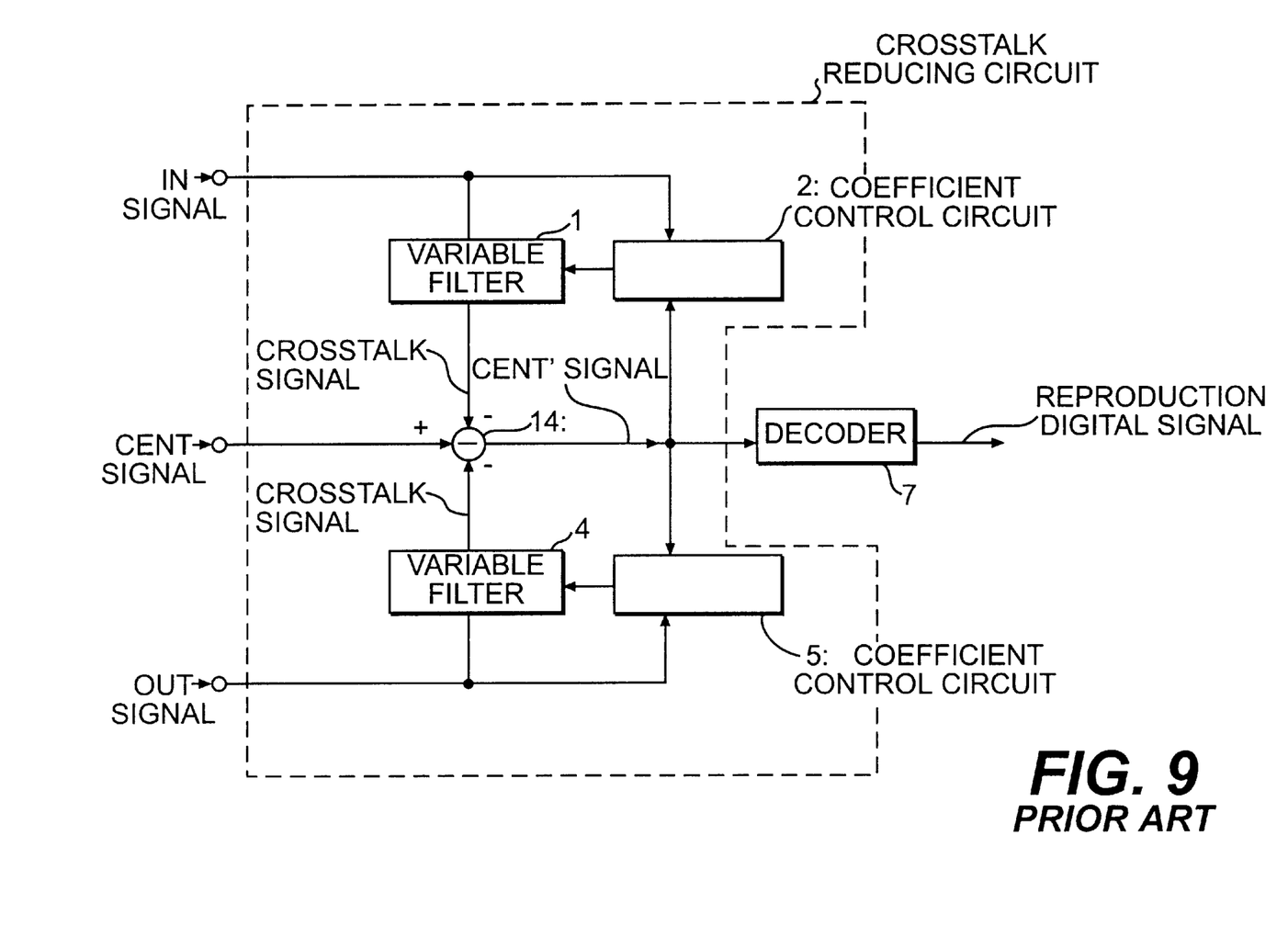
FIG. 9 is an example of a signal block diagram of a crosstalk reducing circuit in a conventional apparatus for reproducing information recorded on a recording medium.

FIG. 9 shows an example of a signal block diagram for a crosstalk reducing circuit in the above-described conventional apparatus. The main track is irradiated with the main beam to obtain a signal associated with the main track (hereinafter referred to as "CENT signal") from the light returned therefrom. Coefficient control circuits 2 and 5 detect crosstalk components included in the CENT signal from the adjacent tracks and set filter coefficients for variable filters 1 and 4, depending on the quantities of residual crosstalk.

The variable filters 1 and 4 have attenuation characteristics that are in accordance with coefficients set by the coefficient control circuits 2 and 5, respectively. The signal from the adjacent track inside the main track (hereinafter referred to as "IN signal") and the signal from the adjacent track outside the main track (hereinafter referred to as "OUT signal") a re converted into crosstalk signals from the adjacent tracks by being passed through the variable filters 1 and 4, respectively.

A subtractor 14 subtracts the crosstalk signals from the CENT signal to produce a main track signal in which the effect of the crosstalk from the adjacent tracks has been reduced (hereinafter referred to as "CENT' signal"). The coefficient control circuits detect any signal components from the adjacent tracks remaining in the CENT' signal and calculates more appropriate coefficients in accordance with the quantities of the signal components of the adjacent tracks to set the filter coefficients of the variable filters 1 and 4 again.

Figure 11A:
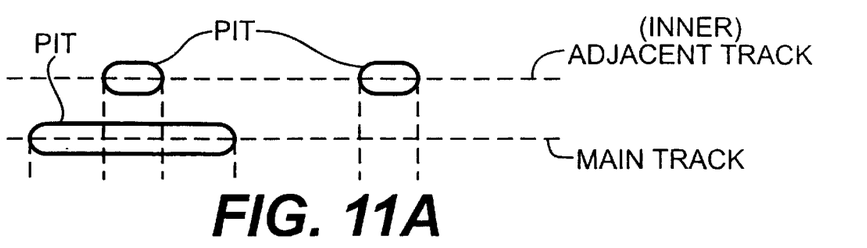
FIGS. 11A through 11E are views showing signal waveforms at various points of the crosstalk reducing circuit in the conventional apparatus for reproducing information recorded on a recording medium along a time axis t in association with pits being scanned.
Figure 11B:
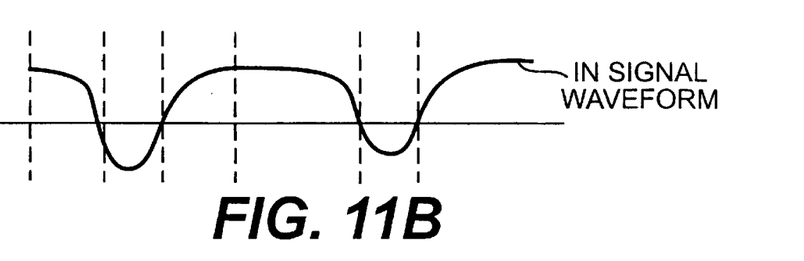
Figure 11C:
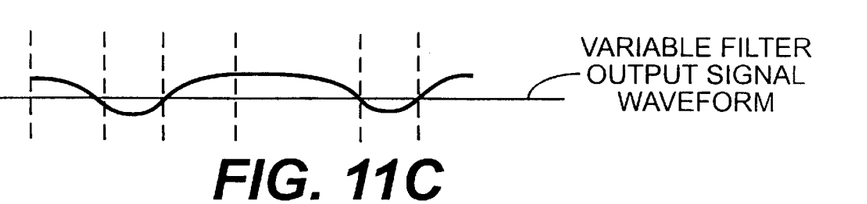
Figure 11D:
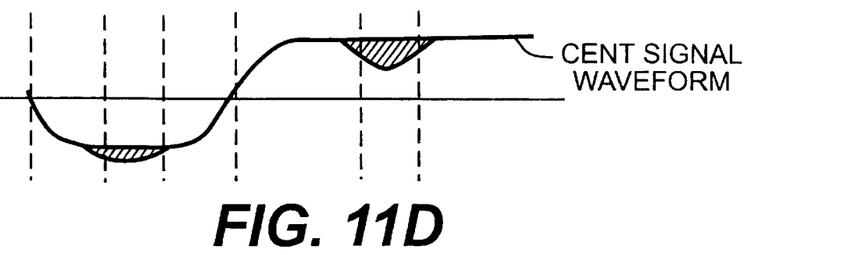
Figure 11E:
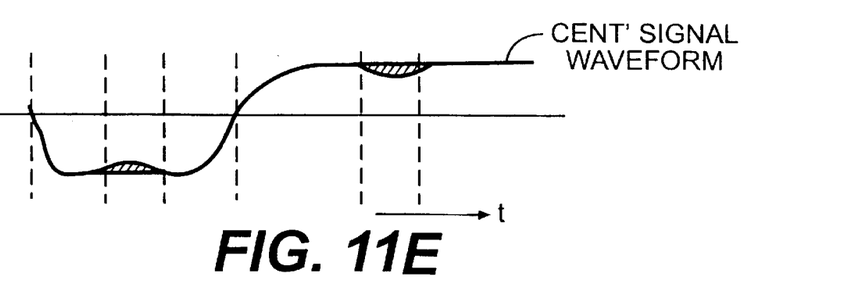

FIGS. 11B through 11E show signal waveforms at various parts of the crosstalk reducing circuit in the conventional apparatus shown in FIG. 9 obtained from the pit pattern shown in FIG. 11A. FIG. 11B shows a waveform of the IN signal from the inner adjacent track, and FIG. 11C shows a waveform of a signal output by the variable filter 1. FIG. 11D shows a waveform of the CENT signal which is inputted to the crosstalk reducing circuit, and FIG. 11E shows a waveform of the CENT' signal which is inputted to a decoder 7.

As described above, the crosstalk reducing circuit of FIG. 9 removes crosstalk signals from the adjacent tracks inside and outside the main track from the CENT signal to generate the CENT' signal which is inputted to the decoder 7. The decoder 7 converts the inputted CENT signal into a binary form to output it as a reproduction digital signal.

Meanwhile, the effect of the crosstalk from the adjacent tracks on the main track varies in its degree depending on the state of the main track (i.e., whether there is a pit or mirror).

Figure 10:
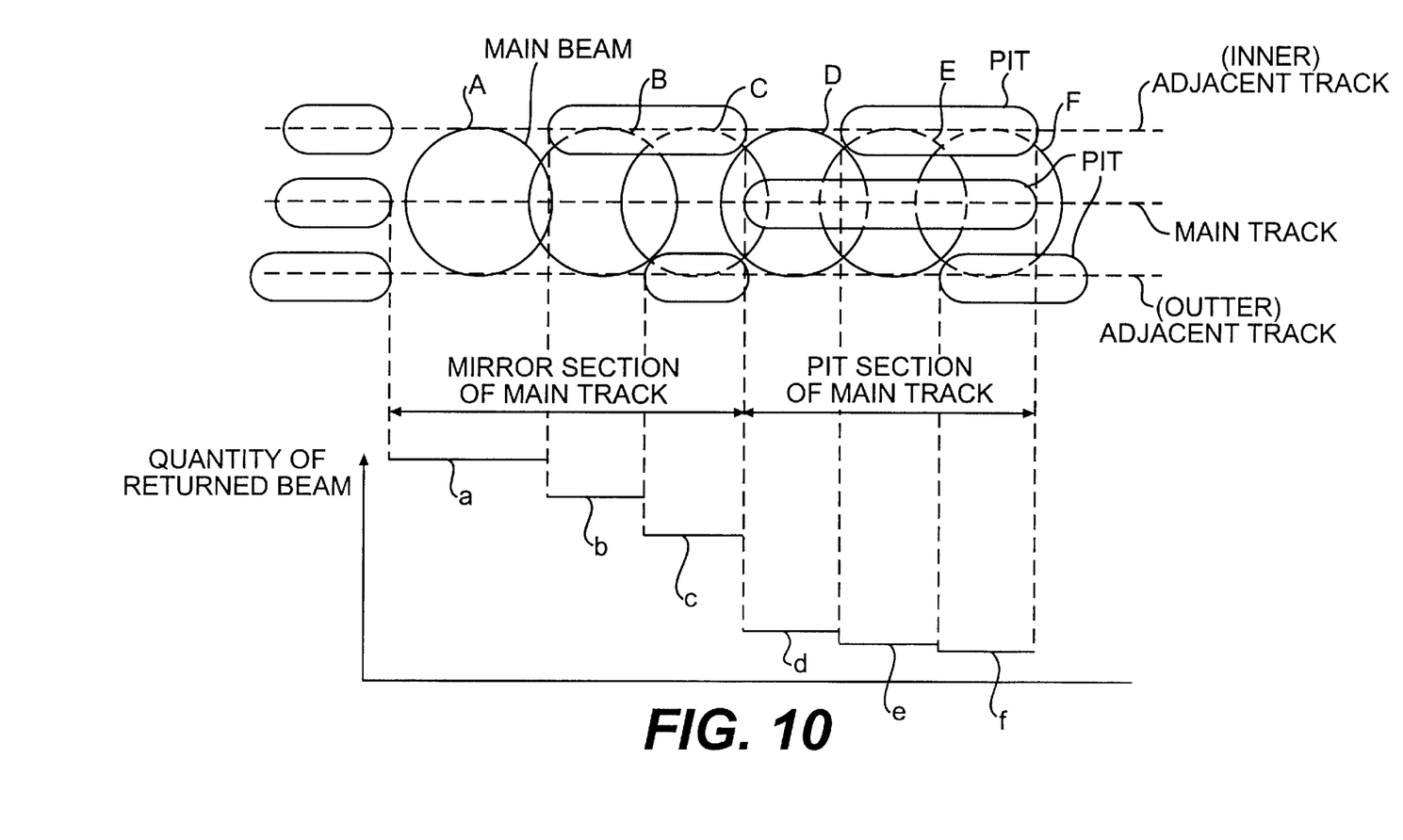
FIG. 10 illustrates the quantity of a main beam returned which varies depending on a main track being scanned and tracks adjacent thereto.

FIG. 10 shows how the effect of the crosstalk from the adjacent tracks varies in its degree depending on the state of the main track, i.e., depending on whether there is a pit or mirror. Specifically, FIG. 10 shows variation in the quantity of the returned main beam that varies depending on the pit patterns of the main and adjacent tracks.

Referring to FIG. 10, when the region A is irradiated by the main beam, i.e., when there is a mirror on the main track and there is a mirror on both of the inner and outer adjacent tracks, the quantity of the main beam reflected is at the level indicated by "a". When the region B is irradiated by the main beam, i.e., when there is a mirror on the main track, a pit on the inner adjacent track and a mirror on the outer adjacent track, the quantity of the main beam returned is affected by crosstalk from the inner pit and is at the level indicated by "b,"which is lower than that indicated by "a".

Further, when the region C is irradiated by the main beam, i.e., when there is a mirror on the main track and there is a pit on both of the inner and outer adjacent tracks, the quantity of the main beam reflected is affected by crosstalk from each of the inner and outer pits and is at the level indicated by "c,"which is lower than that indicated by "b".

It is apparent from the regions described above that when the region on the main track irradiated by the main beam is a mirror, the quantity of the reflected main beam is greatly reduced by the presence of a pit on an adjacent track. Especially, in the case where there is a pit on both of the inner and outer adjacent tracks (the case of the region C), the quantity of the reflected beam available is only substantially one-half of that available when there is no effect of the adjacent tracks (the case of the region A).

Referring to FIG. 10, when the region D is irradiated by the main beam, i.e., when there is a pit on the main track and there is a mirror on both of the inner and outer adjacent tracks, the quantity of the main beam reflected is at the level indicated by "d". When the region E is irradiated by the main beam, i.e., when there is a pit on the main track, a pit on the inner adjacent track and a mirror on the outer adjacent track, the quantity of the main beam returned is affected by crosstalk from the inner pit and is at the level indicated by "e," which is slightly lower than that indicated by "d". Further, when the region F is irradiated by the main beam, i.e., when there is a pit on the main track and there is a pit on both of the inner and outer adjacent tracks, the quantity of the main beam reflected is affected by crosstalk from each of the inner and outer pits and is at the level indicated by "f," which is almost the same as that indicated by "e".

It is apparent from the above description that when the region on the main track irradiated by the main beam is a pit, the quantity of the reflected main beam is also affected by a pit on an adjacent track but to a degree less than when there is a mirror on the main track. That is, the effect of the adjacent tracks on the main track is greater when there is a mirror on the main track and smaller when there is a pit on the main track. Thus, the effect of the adjacent tracks varies depending on the state of the main track.

Referring to the signal waveform diagram in FIG. 11D, crosstalk components (the shaded regions in FIG. 11D) from a pit on an adjacent track (the inner track in FIG. 11A) is at a lower level when there is a pit on the main track and at a higher level when there is a mirror on the main track.

Therefore, when the coefficients of the variable filters are kept constant irrespective of the state of the main track, as shown in FIG. 11E, cancellation performed on the CENT' signal obtained by removing crosstalk signals will be excessive when there is a pit on the main track and will be conversely insufficient when there is a mirror. As a result, the effect of the adjacent track will still remain as indicated by the shaded regions in FIG. 11E. This equally applies to subtraction of a crosstalk signal that is obtained in accordance with the quantity of crosstalk from the outer adjacent track.

The effect of crosstalk from the adjacent tracks varies in its degree with the variation of signal levels that depends on whether there is a pit or mirror on the main track. It has been difficult for conventional apparatus for reproducing information recorded on a recording medium to properly cancel crosstalk from each of the tracks adjacent to the main track because the cancellation becomes excessive or insufficient.

SUMMARY OF THE INVENTION

Accordingly, the present invention is directed to an apparatus for reproducing information recorded on a recording medium, having a crosstalk reducing circuit that substantially obviates one or more of the problems due to limitations and disadvantages of the related art.

An object of the present invention is to provide an apparatus for reproducing information recorded on a recording medium characterized in that it includes a signal reader for outputting signals read from a main track on a recording medium to be reproduced and a track adjacent to the main track, a variable filter for filtering the signal read from the adjacent track to convert it By into crosstalk signal to the main track, a subtractor for subtracting the crosstalk signal from the signal read from the main track, and a crosstalk signal corrector for correcting a level of the crosstalk signal based on the signal read from the main track.

Another object of the present invention is to provide of an apparatus for reproducing information recorded on a recording medium including a signal reader for outputting signals read from a main track on a recording medium to be reproduced and a track adjacent to the main track, a variable filter for filtering the signal read from the adjacent track to convert it into crosstalk signal to the main track, a subtractor for subtracting the crosstalk signal from the signal read from the main track, and a crosstalk signal corrector for correcting a level of the crosstalk signal based on the signals read from the main track and the adjacent track.

The above-described configurations of the invention allows cancellation of crosstalk to be properly without being excessive or insufficient.

DETAILED DESCRIPTION OF PREFERRED EMBODIMENTS

Preferred embodiments of the present invention will now be described in detail.

Figure 1:
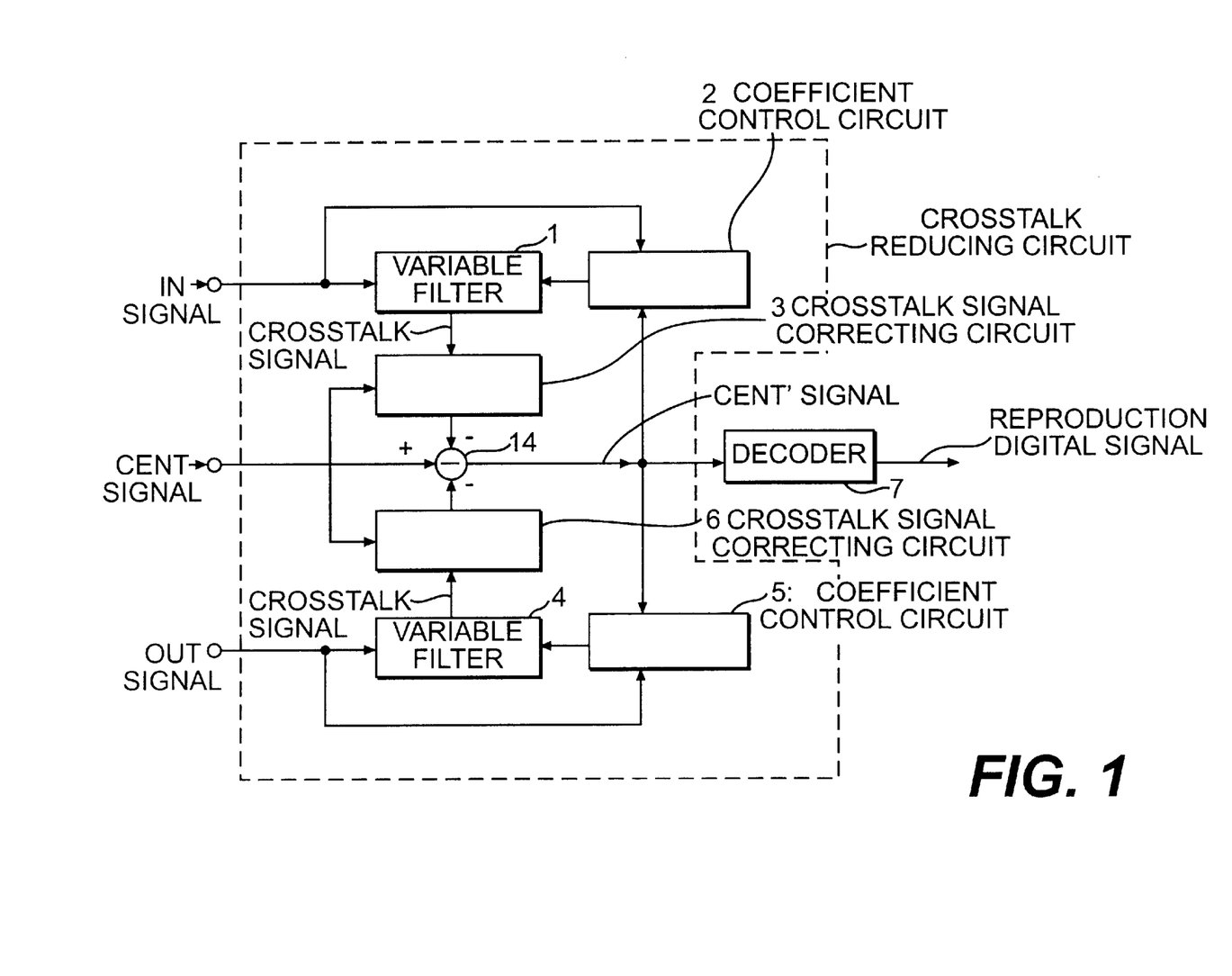
FIG. 1 is a signal block diagram of a crosstalk reducing circuit in an apparatus for reproducing information recorded on a recording medium according to a first embodiment of the present invention.

FIG. 1 is a signal block diagram of a crosstalk reducing circuit in an apparatus for reproducing information recorded on a recording medium according to a first embodiment of the present invention. The crosstalk reducing circuit of the present embodiment has a configuration that includes, in addition to the conventional circuitry for reducing crosstalk described with reference to FIG. 9, crosstalk signal correcting circuits 3 and 6 for correcting crosstalk signals output by the variable filters 1 and 4 based on the level of the CENT signal.

Elements that are substantially identical or perform the same or nearly the same functions in FIG. 1 as FIG. 9, other than the crosstalk signal correcting circuits 3 and 6, are indicated by the same reference numbers as those in FIG. 9 and will not be described here in detail.

The crosstalk signal correcting circuit 3 controls the level of the crosstalk signal output by the variable filter 1 based on the IN signal in accordance with the CENT signal. Specifically, it controls the level of the crosstalk signal output such that the level of the crosstalk signal is decreased when there is a pit on the main track (i.e., when the CENT signal is at a lower level) and such that the level of the crosstalk signal is increased when there is a mirror on the main track (i.e., when the CENT signal is at a higher level). The level of the crosstalk signal output by the variable filter 4 based on the OUT signal is controlled by the crosstalk signal correcting circuit 6 in accordance with the CENT signal as done for the IN signal.

Figure 2:
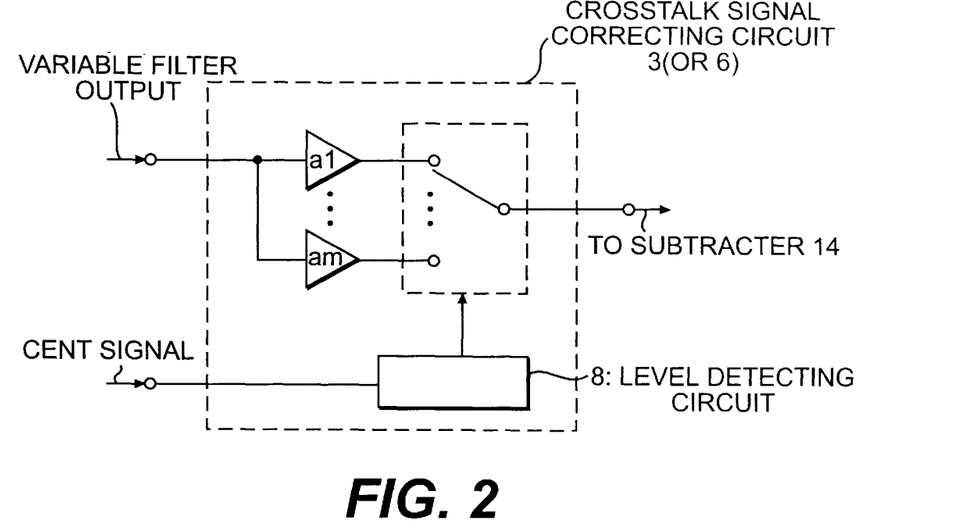
FIG. 2 illustrates an alternate configuration of a crosstalk signal correcting circuit in the crosstalk reducing circuit of the first embodiment of the present invention.
Figure 3:
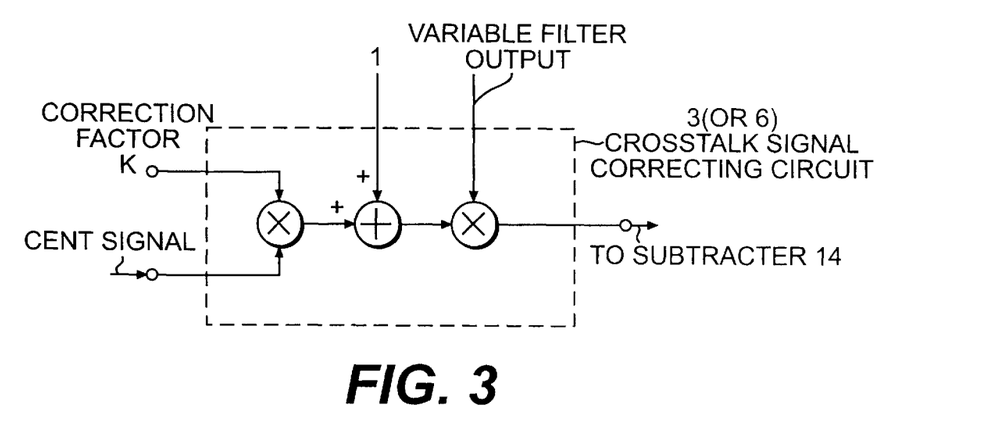
FIG. 3 illustrates a second alternate configuration of a crosstalk signal correcting circuit in the crosstalk reducing circuit of the first embodiment of the present invention.
Figure 4:
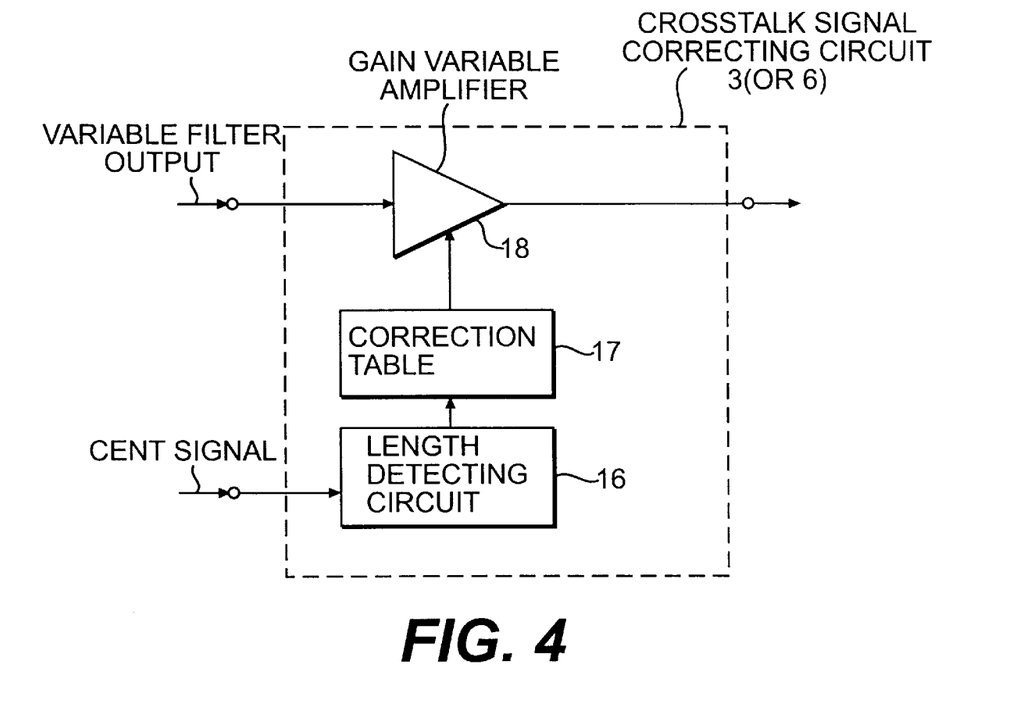
FIG. 4 illustrates a third alternate configuration of a crosstalk signal correcting circuit in the crosstalk reducing circuit of the first embodiment of the present invention.

Each of the crosstalk signals whose levels have been corrected by the crosstalk signal correcting circuits 3 and 6 is subtracted from the CENT signal by the subtractor 14 to remove the crosstalk signals included in the CENT signal which have been generated in accordance with the quantities of crosstalk from the inner and outer adjacent tracks. The output signal of the subtractor 14 is inputted to the decoder 7 as the CENT' signal from which crosstalk has been canceled and which is output, through the decoder 7, as a reproduction digital signal. FIGS. 2 through 4 illustrate specific examples of the configuration of the crosstalk signal correcting circuit 3 or 6.

In the example of configuration in FIG. 2, there is provided a level detecting circuit 8 for detecting the level of the CENT signal associated with the main track. In accordance with the detection output of the level detecting circuit 8, an appropriate gain is selected from among a plurality of preset gains (al through am as shown in FIG. 2) depending on the level of the CENT signal. Thus, the crosstalk signal inputted by the variable filter 1 or 4 is corrected depending on the state of the main track. The corrected signal is then inputted to the subtractor 14.

As shown in FIG. 3, the crosstalk signal correcting circuit 3 or 6 is capable of correcting the crosstalk signal by multiplying the output of the variable filter 1 or 4 by a correction coefficient that varies depending on the level of the CENT signal, e.g., 1+K×CENT signal (K is a correction factor).

That is, the crosstalk signal to be subtracted is (1+K× CENT signal) X (variable filter output). Therefore, when the polarity of the CENT signal is defined to be positive and negative in regions corresponding to a mirror and a pit, respectively, the CENT signal is positive when there is a mirror on the main track and the correction coefficient (1+K (CENT )) signal is greater than 1. Conversely, when there is a pit on the main track, the CENT signal is negative and the correction coefficient (1+K (CENT)) signal is less than 1.

Although an example of correction of a crosstalk signal depending on the level of a CENT signal has been described, the present invention is not limited thereto. For example, a determination may be made on whether there is a pit or a mirror on the main track by detecting whether the CENT signal is 0 or 1 by comparing the CENT signal with a predetermined reference value using a comparator and the level of a crosstalk signal may be corrected depending on the result of determination.

The crosstalk signal correcting circuit 3 or 6 may have a configuration as shown in FIG. 4. In FIG. 4, the level of a CENT signal is detected by a detector for detecting the length of a pit or mirror section, e.g., a length detecting circuit 16 includes a shift register to detect the length of a pit or mirror section on the main track being scanned. The detection output is inputted to a correction table including a ROM, or the like, that stores gain coefficients set in association with the lengths of pit and mirror sections to select a gain coefficient suitable for the length of the section. The gain of a gain variable amplifier 18 is controlled by the gain coefficient to change the level of the variable filter output.

Therefore, the crosstalk signal correcting circuits 3 and 6 control respective crosstalk signals such that the levels of the crosstalk signals are decreased when there is a pit on the main track and increased when there is a mirror on the main track.

Figure 5A:
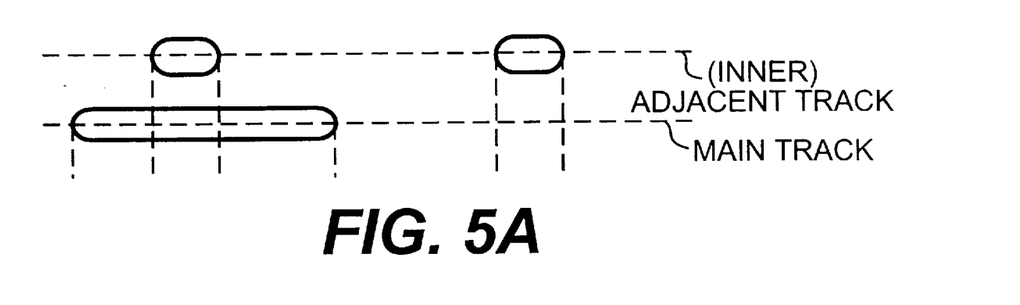
FIGS. 5A through 5F are views showing signal waveforms at various points of the crosstalk reducing circuit along a time axis (t) in association with pits being scanned.
Figure 5B:
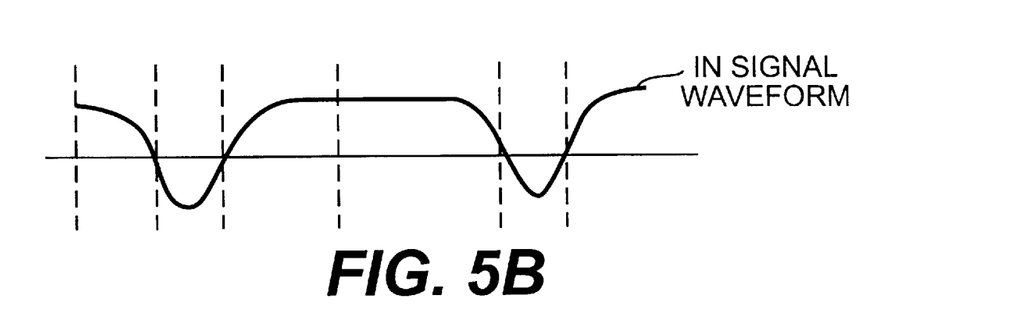
Figure 5C:
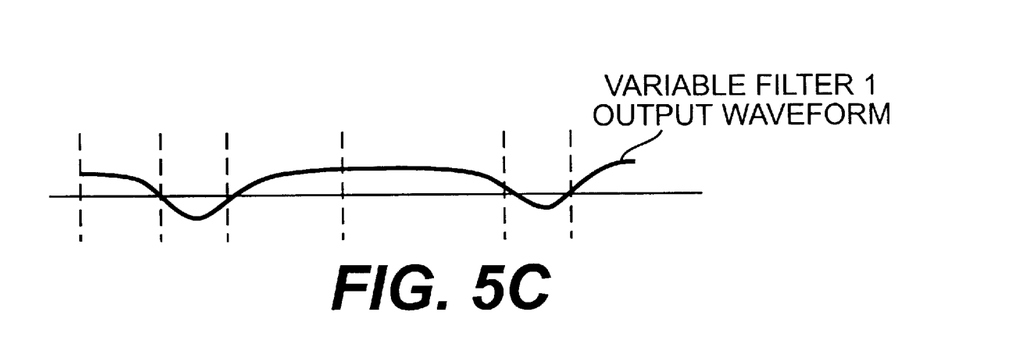
Figure 5D:
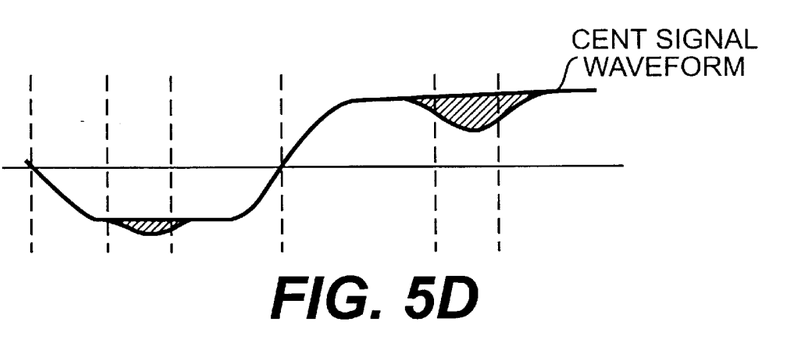
Figure 5E:
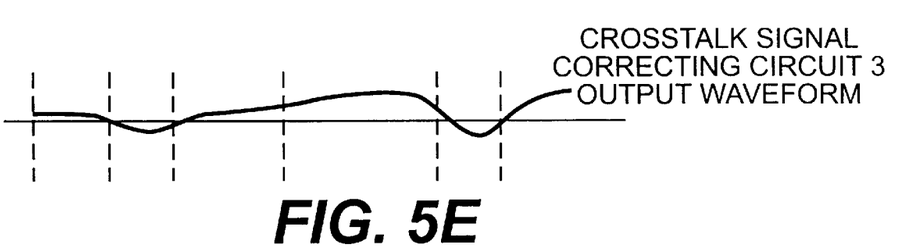
Figure 5F:
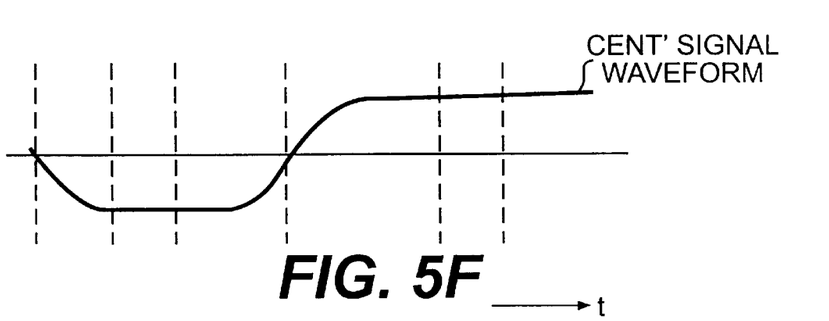

FIGS. 5B through 5F show signal waveforms of various parts of the crosstalk reducing circuit as shown in FIG. 1, during the reproduction of the pit pattern shown in FIG. 5A. FIG. 5B shows the waveform of the IN signal of the inner adjacent track, and FIG. 5C shows the waveform of the output signal of the variable filter 1. FIG. 5D shows the waveform of the CENT signal inputted to the crosstalk reducing circuit, and FIG. 5E shows the waveform of the output signal of the crosstalk signal correcting circuit 3. FIG. 5F shows the waveform of the CENT' signal inputted to the decoder 7. FIGS. 5A through 5D waveforms correspond to FIGS. 11A through 11D, respectively.

The waveform of the output signal of the crosstalk signal correcting circuit 3, as shown in FIG. 5E, shows that the crosstalk signal correcting circuit 3 has corrected the output waveform of the variable filter 1 to be at a lower level when there is a pit on the main track and at a higher level when there is a mirror on the main track. Such a process provides a waveform that is substantially the same as the crosstalk components, the shaded portions in FIG. 5D, included in the waveform of the CENT signal as shown in FIG. 5D. The output of the crosstalk signal correcting circuit 3 is subtracted from the CENT signal to provide a CENT' signal from which crosstalk components have been properly eliminated without any excess or deficiency as shown in FIG. 5F.

Although the cancellation of crosstalk from the adjacent track inside the main track has been described with reference to FIGS. 5A through 5F, the description equally applies to the cancellation of crosstalk from the outer adjacent track if the IN signal is replaced with the OUT signal and will therefore not be repeated.

Figure 6:
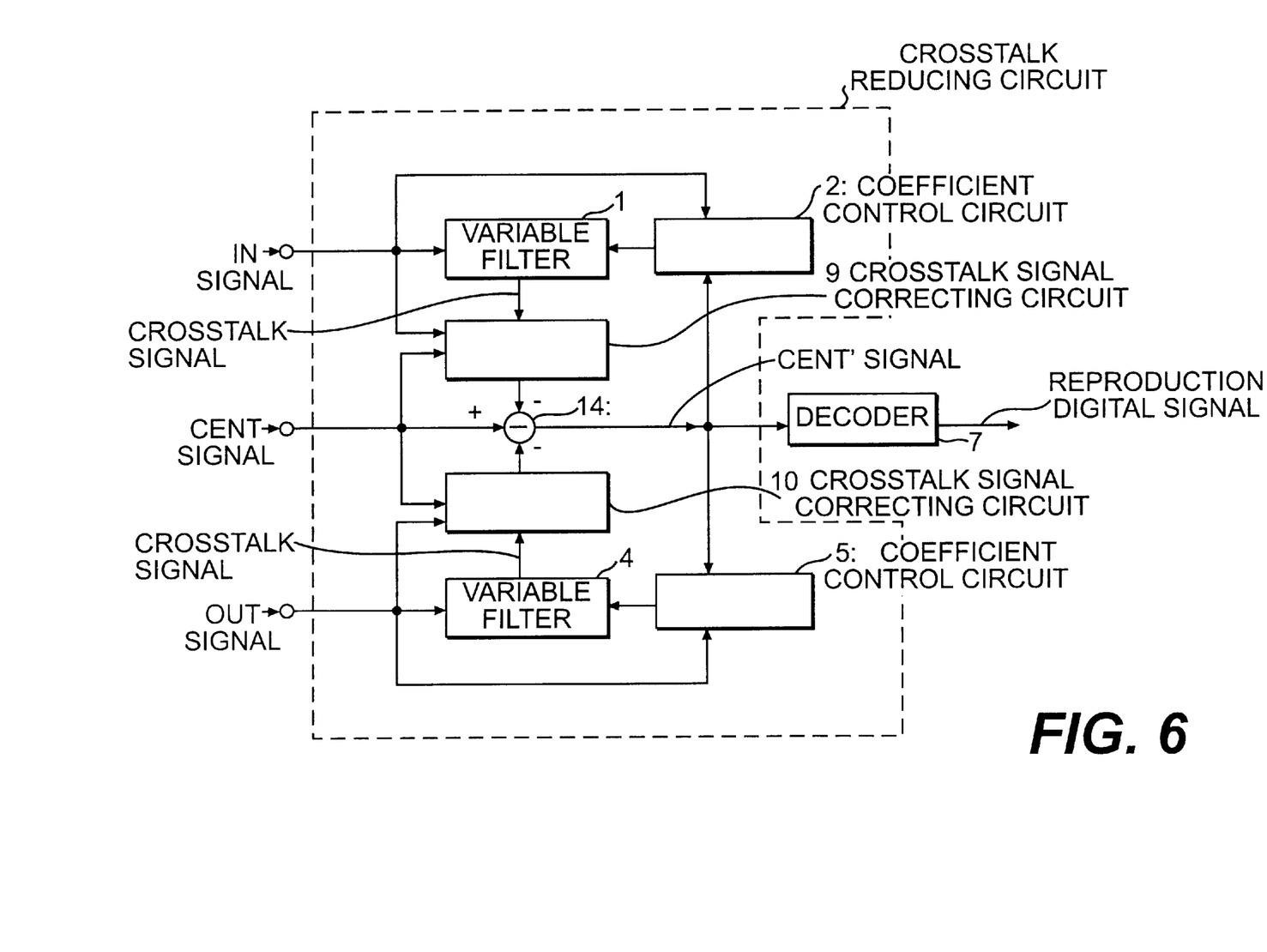
FIG. 6 is a signal block diagram of a crosstalk reducing circuit in an apparatus for reproducing information recorded on a recording medium according to a second embodiment of the present invention.

A second embodiment of the present invention will now be described. FIG. 6 is a signal block diagram of a crosstalk reducing circuit in an apparatus for reproducing information recorded on a recording medium according the second embodiment of the invention. In FIG. 6, elements equivalent to those in FIG. 1 are indicated by like reference numbers.

Figure 7A:
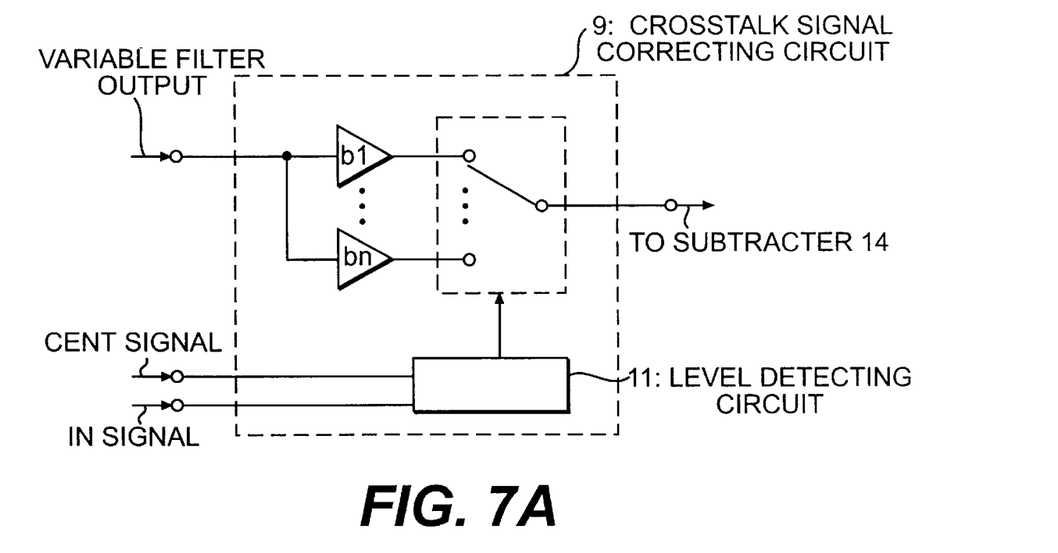
FIGS. 7A and 7B illustrate configurations of crosstalk signal correcting circuits in the crosstalk reducing circuit in the second embodiment of the present invention.
Figure 7B:
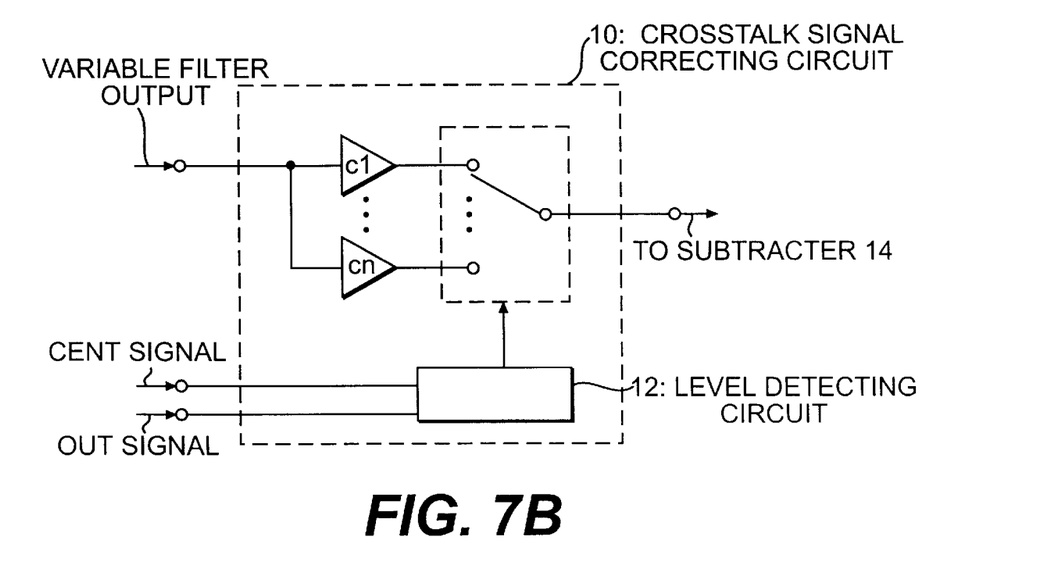

The crosstalk signal correcting circuits 3 and 6, in the crosstalk reducing circuit, as shown in FIG. 1, control crosstalk signals output by the variable filters 1 and 4, respectively, based only on the CENT signal. FIG. 6 is different in that a crosstalk signal correcting circuit 9 controls the level of the crosstalk signal from the inner adjacent track output by the variable filter 1 based on the CENT signal and IN signal and a crosstalk signal correcting circuit 10 controls the level of the crosstalk signal from the outer adjacent track output by the variable filter 4 based on the by CENT signal and OUT signal. Elements in FIG. 6 other than the crosstalk signal correcting circuits 9 and 10 are identical to those in FIG. 1 and will not be described here. FIGS. 7A and 7B show examples of the specific configuration of the crosstalk signal correcting circuits in the crosstalk reducing circuit in the second embodiment. FIGS. 7A and 7B show configurations of the crosstalk signal correcting circuits 9 and 10, respectively.

In the configuration of FIG. 7A, there is provided a level detecting circuit 11 for detecting the level of each of the CENT signal associated with the main track and the IN signal associated with the inner adjacent track. In accordance with the detection output of the level detecting circuit 11, an appropriate gain is selected from among a plurality of preset gains (b1 through bn as shown in FIG. 7A) to correct the crosstalk signal inputted by the variable filter 1. The corrected signal is then inputted to the subtractor 14.

The plurality of gains b1 through bn are set in advance in association with respective combinations of the levels of the CENT signal and IN signal. By selecting an appropriate gain for a combination of the levels of the CENT signal and IN signal, detected by the level detecting circuit 11, crosstalk from the inner adjacent track included in the main track can be properly canceled taking not only the level of the CENT signal but also the level of the IN signal into account.

In the configuration of FIG. 7B, there is included a level detecting circuit 12 for detecting the level of each of the CENT signal associated with the main track and the OUT signal associated with the outer adjacent track. In accordance with the detection output of the level detecting circuit 12, an appropriate gain is selected from among a plurality of preset gains (c1 through cn in FIG. 7B) to correct the crosstalk signal inputted by the variable filter 4. The corrected signal is then inputted to the subtractor 14.

The plurality of gains c1 through cn combination advance in association with respective combinations of the levels of the CENT signal and OUT signal. By selecting an appropriate gain for a combination of the levels of the CENT signal and OUT signal detected by the level detecting circuit 12, crosstalk from the outer adjacent track included in the main track can be properly canceled taking not only the level of the CENT signal but also the level of the OUT signal into account.

Figure 8A:
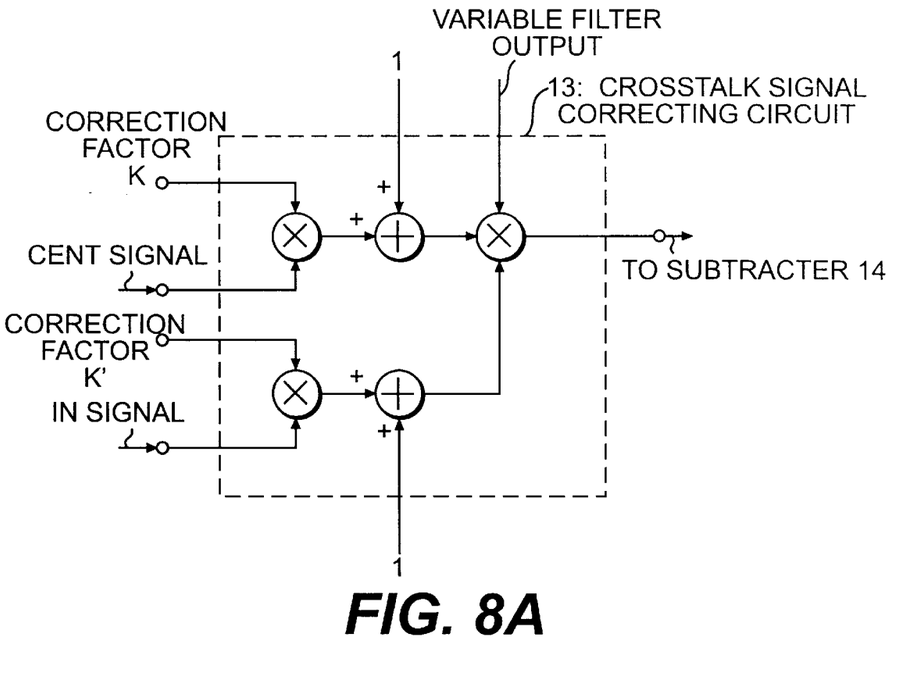
FIGS. 8A and 8B illustrate alternate configurations of the crosstalk signal correcting circuits in the crosstalk reducing circuit in the second embodiment of the present invention.
Figure 8B:
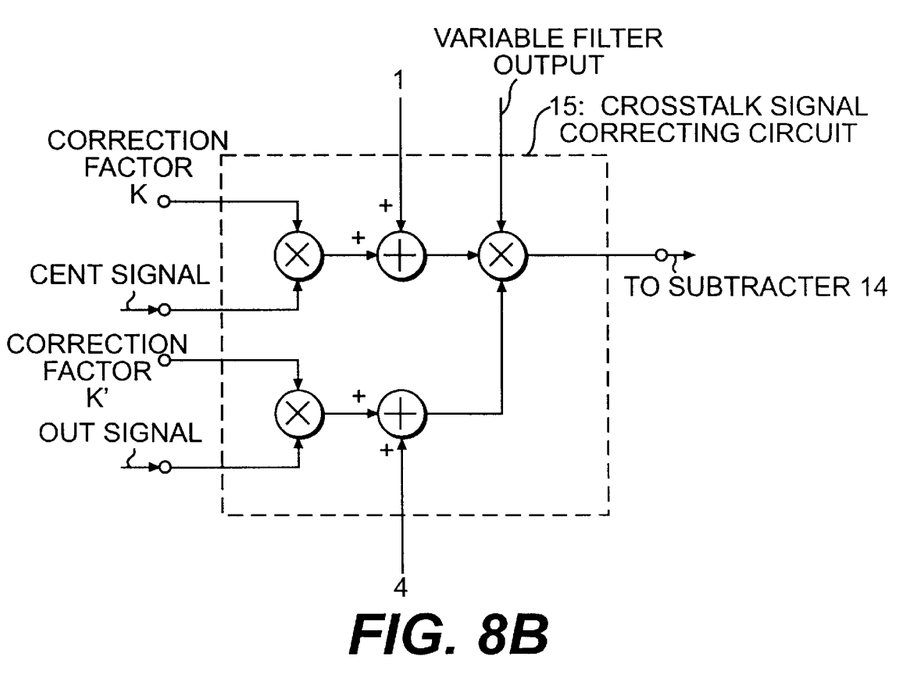

FIGS. 8A and 8B show alternate crosstalk signal correcting circuits in the crosstalk reducing circuit of the second embodiment.

FIG. 8A shows a crosstalk signal correcting circuit 13 for the IN signal, and FIG. 8B shows a crosstalk signal correcting circuit 14 for the OUT signal.

In FIG. 8A, a crosstalk signal is corrected by multiplying the output of the variable filter 1 by a correction coefficient associated with the level of the CENT signal and a correction coefficient associated with the level of the IN signal.

Assume, for example, that (1+K (CENT signal)) represents the correction coefficient associated with the level of the CENT signal and that (1+K'(IN signal)) represents the correction coefficient for the IN signal where K and K' represent correction factors that are appropriately set. The output of the variable filter 1 is multiplied by these correction coefficients. In other words, the crosstalk signal from the inner adjacent track that is to be subtracted is given by (1+K(CENT signal))×(1+K'(IN signal))×(variable filter output).

In FIG. 8B, a crosstalk signal is corrected by multiplying the output of the variable filter 4 by a correction coefficient associated with the level of the CENT signal and a correction coefficient associated with the level of the OUT signal.

Assume, for example, that (1+K(CENT signal)) represents the correction coefficient associated with the level of the CENT signal and that (1+K"(OUT signal)) represents the correction coefficient for the OUT signal where K and K" represent correction factors that are appropriately set. The output of the variable filter 4 is multiplied by the correction coefficients. In other words, the crosstalk signal from the outer adjacent track that is to be subtracted is given by (1+K(CENT signal))×(1+K"(OUT signal))×(variable filter output).

The polarity of the CENT, IN, and OUT signals are defined to be positive and negative in regions corresponding to a mirror and a pit, respectively. Thus each of the correction coefficients is greater than 1 in a region corresponding to a mirror and smaller than 1 in a region corresponding to a pit.

With the above-described configuration of the crosstalk signal correcting circuits, the levels of crosstalk signals are corrected not only depending on whether there is a pit or mirror on the main track but also depending on whether there is a pit or mirror on the adjacent tracks. This allows cancellation of crosstalk signals with higher accuracy than that available in the first embodiment.

In the apparatus for reproducing information recorded on a recording medium according to each of the above-described embodiments, the CENT, IN, and OUT signals may be obtained by irradiating the main track and adjacent tracks with three beams, i.e., main beam and subbeams. Alternatively, the tracks may be irradiated with a single beam and the read signals may be stored in a track memory and the CENT, IN, and OUT signals may be obtained therefrom in synchronization with the rotation of the disk.

Although the crosstalk signal correcting circuits in each of the embodiments have been arranged so as to correct the output of the variable filters 1 and 4, the present invention is not limited to such configurations. The correcting circuits also may be disposed in front of the variable filters 1 and 4, for example.

Furthermore, although each of the embodiments has referred to a recording information reproducing apparatus for reproducing information recorded on an optical disk, the present invention is not limited to optical disks and may be applied to reproduction apparatus for reproducing information recorded on recording media such as optical cards and optical tapes.

The above-described configuration of the present invention makes it possible to perform proper crosstalk cancellation without any excess or deficiency and to reproduce information recorded on a recording medium with high fidelity.

Although the present invention and its advantages have been described in detail, it should be understood by those skilled in the art that various changes, substitutions and alterations may be made herein without departing from the spirit and scope of the invention as defined by the appended claims.

What is claimed is:

1. An apparatus for reproducing information recorded on a recording medium, comprising:

a signal reader for outputting signals read from a main track on a recording medium to be reproduced and a track adjacent to the main track;

a variable filter for filtering the signal read from the adjacent track and converting the signal into a crosstalk signal of the main track;

a subtractor for subtracting the crosstalk signal from the signal read from the main track; and a crosstalk signal corrector for correcting a level of the crosstalk signal outputted from the variable filter based on the signal read from the main track.

2. The apparatus according to claim 1, wherein the crosstalk signal corrector corrects the level of the crosstalk signal in accordance with a level of the signal read from the main track.

3. The apparatus according to claim 1, further comprising a determinator for determining whether there is currently a pit or a mirror on the main track being read, wherein the crosstalk signal corrector corrects the level of the crosstalk signal in accordance with the determination by the determinator.

4. The apparatus according to claim 3, wherein the crosstalk signal corrector performs correction such that the level of the crosstalk signal is decreased when the determinator determines that there is a pit on the main track and the level of the crosstalk signal is increased when there is a mirror on the main track.

5. The apparatus according to claim 1, further comprising a detector for detecting a length of a pit or mirror section on the main track being currently read, wherein the crosstalk signal corrector corrects the level of the crosstalk signal in accordance with the detection by the detector.

6. An apparatus for reproducing information recorded on a recording medium, comprising:
 a signal reader for outputting signals read from a main track on a recording medium to be reproduced and a track adjacent to the main track;
 a variable filter for filtering the signal read from the adjacent track to convert it into a crosstalk signal of the main track;
 a subtractor for subtracting the crosstalk signal from the signal read from the main track; and
 a crosstalk signal corrector for correcting a level of the crosstalk signal outputted from the variable filter based on the signals read from the main track and the adjacent track.

7. The apparatus according to claim 6, wherein the crosstalk signal corrector corrects the level of the crosstalk signal in accordance with levels of the signal read from the main track and the signal read from the adjacent track.

8. The apparatus according to claim 6, further comprising a determinator for determining whether there is currently a pit or a mirror on the main track and adjacent track being read, wherein the crosstalk signal corrector corrects the level of the crosstalk signal in accordance with the determination by the determinator.

9. The apparatus according to claim 8, wherein the crosstalk signal corrector performs correction such that the level of the crosstalk signal is decreased when the determinator determines that there is a pit on the main track and the level of the crosstalk signal is increased when there is a mirror on the main track.

10. The apparatus according to claim 6, comprising a detector for detecting a length of a pit or mirror section on the main track being currently read, wherein the crosstalk signal corrector corrects the level of the crosstalk signal in accordance with the detection by the detector.

11. A method for reproducing information recorded on a recording medium, the method comprising:
 reading signals from a main track on a recording medium to be reproduced and from a track adjacent to the main track;
 filtering, with a variable filter, the signal read from the adjacent track and converting the filtered signal into a crosstalk signal of the main track;
 subtracting the crosstalk signal from the signal read from the main track; and
 correcting a level of the crosstalk signal outputted from the variable filter based on the signal read from the main track.

12. The method according to claim 11, wherein correcting the level of the crosstalk signal is performed in accordance with a level of the signal read from the main track.

13. The method according to claim 11, further comprising the step of determining whether there is currently a pit or a mirror on the main track being read, wherein correcting the level of the crosstalk signal is performed in accordance with the determination of whether there is currently a pit or a mirror on the main track.

14. The method according to claim 13, wherein the correcting the level of crosstalk is performed such that the level of the crosstalk signal is decreased when it is determined that there is a pit on the main track and the level of the crosstalk signal is increased when there is determined that there is a mirror on the main track.

15. The method according to claim 11, further comprising the step of detecting a length of a pit or mirror section on the main track being currently read, wherein the correction to the crosstalk signal is performed in accordance with the detection of the length of a pit or mirror section on the main track.

* * * * *